J. C. PORTERFIELD.
SHIFTING HITCH.
APPLICATION FILED JULY 21, 1921.

1,428,903.

Patented Sept. 12, 1922.
2 SHEETS—SHEET 1.

Inventor
J. C. Porterfield.

By
Lacey & Lacey, Attorneys

J. C. PORTERFIELD.
SHIFTING HITCH.
APPLICATION FILED JULY 21, 1921.
1,428,903.
Patented Sept. 12, 1922.
2 SHEETS—SHEET 2.
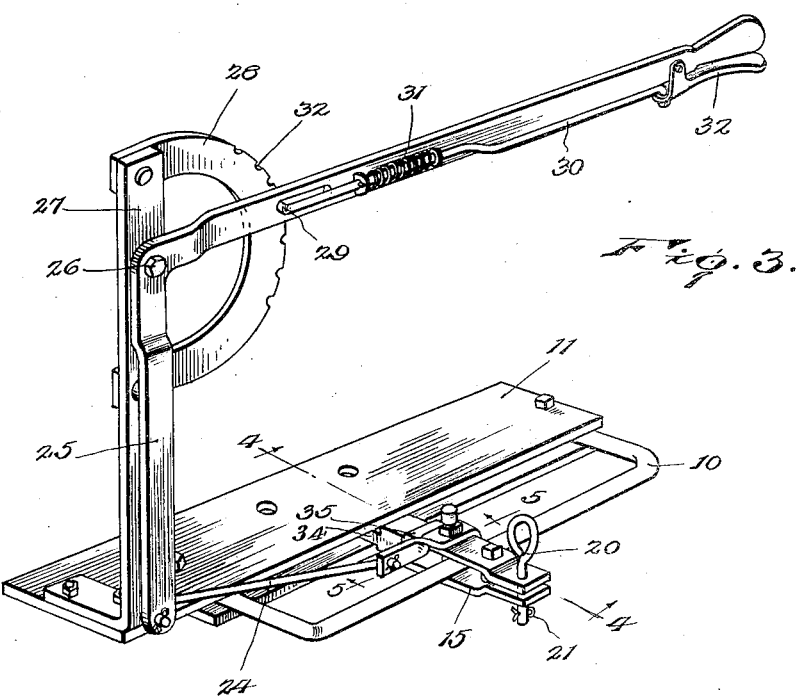
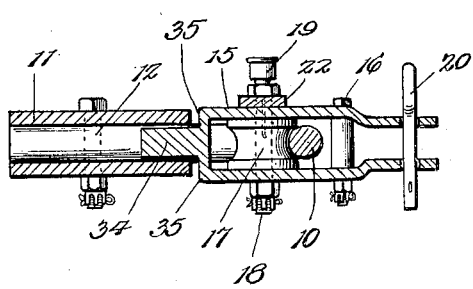
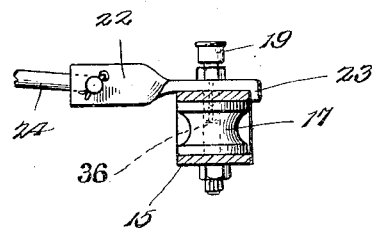
Inventor
J. C. Porterfield.
By Lacey & Lacey, Attorn Patented Sept. 12, 1922.

1,428,903

UNITED STATES PATENT OFFICE.

JOHN C. PORTERFIELD, OF ST. CLAIRSVILLE, OHIO.

SHIFTING HITCH.

Application filed July 21, 1921. Serial No. 486,357.

*To all whom it may concern:*

Be it known that I, JOHN C. PORTERFIELD, a citizen of the United States, residing at St. Clairsville, in the county of Belmont and State of Ohio, have invented certain new and useful Improvements in Shifting Hitches, of which the following is a specification.

The present invention relates to shifting hitches to be applied on a tractor for hauling implements such as plows, harrows, reaping machines, mowing machines, road graders, road drags, etc., used by farmers principally but may be applied between the tractor and any kind of a trailer hitched behind it.

The following advantages are claimed for this universal shifting hitch, namely, it has a very wide range of shifting, about twelve and one-half inches which is about double that of any of the hitches constructed up to the present time. Second: It is provided with a rolling contact which makes it possible to change the position of the trailing implement with one hand with the greatest ease while moving and heavily loaded. Third: The construction of the clevis for coupling is of such construction that almost any implement may be hitched to it and no buckling of the clevis is possible or turning over in backing the implement to which it is connected. In order to make the shifting still more easy, a lubricating device is provided on the clevis.

One embodiment of the invention is illustrated in the accompanying drawings, and Figure 1 shows in rear elevation the device attached to a tractor;

Fig. 3 is a perspective view of the hitch shown on a larger scale;

Fig. 4 is a longitudinal section on the line 4—4 of Figure 3, and

Fig. 5 is a transverse section on the line 5—5 of Figure 3.

Figure 1:
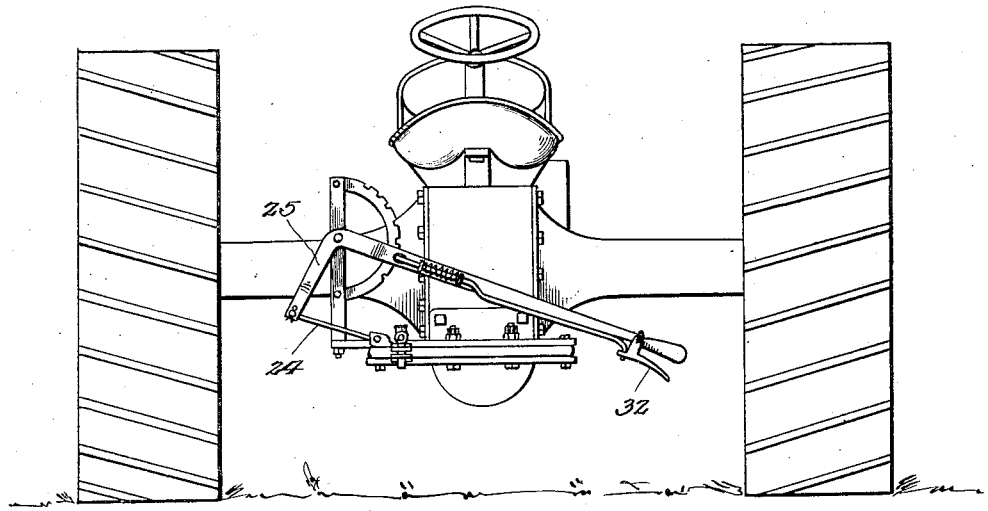
Figure 2:
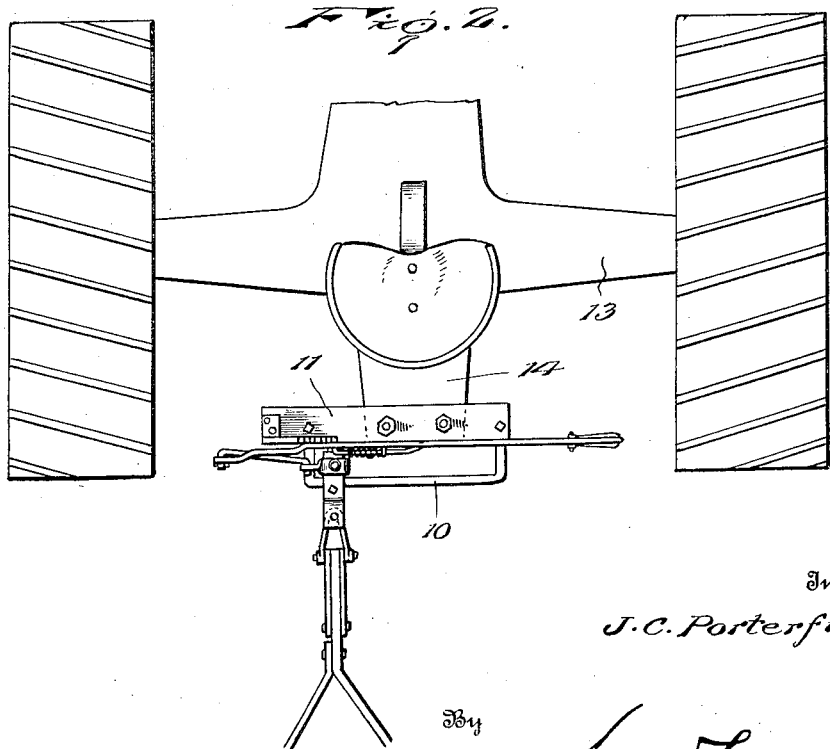
Fig. 2 is a plan view of Figure 1.

A guide rod 10 is held securely between two metal plates forming a bracket 11, in any suitable manner, as by bolts 12. This bracket is attached to the rear end of the tractor 13 which is provided with a tail piece 14 for this purpose.

The guide rod 10 which is preferably U-shaped and of circular cross section projects some distance to the rear of the bracket 11 so as to provide sufficient space between it and the bracket for the clevis 15 to move.

As shown in the drawings, the clevis is constructed from flat iron bent in U-shape to embrace the guide rod 10 and held together on its rear side by a bolt and a distance piece 16. A roller 17 with its axis running in vertical direction is mounted between the upper and lower shanks of the clevis and turns around a pivot bolt 18 running through the same and the shanks of the clevis. This bolt has a central bore and is provided with a lubricating cup 19 on top in order to supply lubricant to the roller. There are provided radial outlets 36 from the central bore of the bolt 18 for this purpose.

At the rear end of the clevis, the top and bottom shanks form an open jaw for inserting the hitching eye of the implement. A king pin 20 runs through corresponding holes in the clevis for attaching the implement and is provided with a split pin 21 at its lower end.

A hook 22 is inserted under the head of the bolt 18 and secured by the same on top of the clevis 15. In order to form a good grip on the clevis, this hook has a downturned lip 23 engaging the edge of the upper plate of the clevis. This hook which is preferably twisted, as shown in Figure 5, has a tail piece to which is movably attached a connecting rod 24, the other end of which is hinged to an elbow lever 25 pivoted around the bolt 26 on the upright 27. This upright is bolted to the bracket 11 and has a circular rack 28 engaging the shifting key 29. This key which has a long shank 30 extending along the horizontal arm of the elbow lever 25 is actuated by a spring 31 to engage in the notches 32 with the rack in an ordinary manner and at its extreme end, the handle 22 actuates the key.

It will be readily understood that the driver seated on the tractor will be able to manipulate the device from his seat by gripping the handle of the elbow lever and raising or lowering it to shift the clevis along the guide rod 10 to any position, right or left, on the guide and that the implement, consequently, will be dragged correspondingly out of line with the tractor.

The clevis 15 is provided with a forwardly extending tongue 34 of slightly less thickness than the space between the top and bottom plates of bracket 11. This tongue projects far enough in between the plates to provide additional supporting means for the clevis. It will, for instance, prevent sideways tilting of the clevis, when the latter is actuated by the connecting rod 24. It will also prevent tilting in longitudinal direction when backing the tractor against the implement and considerably ease the strain on the guide rod 10. The shoulders 35 formed on the clevis above and below the tongue 34 will abut against the edges of the bracket 11 in backing, thereby also relieve the guide rod 10 from undue strain.

It will be understood that the word "tractor" includes a tractor or tractor engine or any other device for propelling an implement behind it on the ground.

Having thus described the invention, what is claimed as new is:

A shifting hitch adapted to be secured on a tractor comprising a bracket including a pair of vertically spaced front plates and a transverse guide rod having its bent ends secured between said plates; a clevis having a solid body with a forwardly extending tongue engaging between said plates, shoulders being formed adjacent the tongue and provided with a pair of rearwardly extending arms, a roller pivoted between said arms and normally engaging said guide rod, and means having connection with said clevis for shifting the same along said guide rod; said shoulders being adapted to transmit a forward thrust delivered on the clevis to said front plates, thereby releasing engagement between said roller and said guide rod.

In testimony whereof I affix my signature.

JOHN C. PORTERFIELD.